April 8, 1930.    F. W. AXTELL    1,753,638
PROCESS OF MAKING COUPLINGS FOR SUCKER RODS AND THE LIKE
Filed Sept. 26, 1927
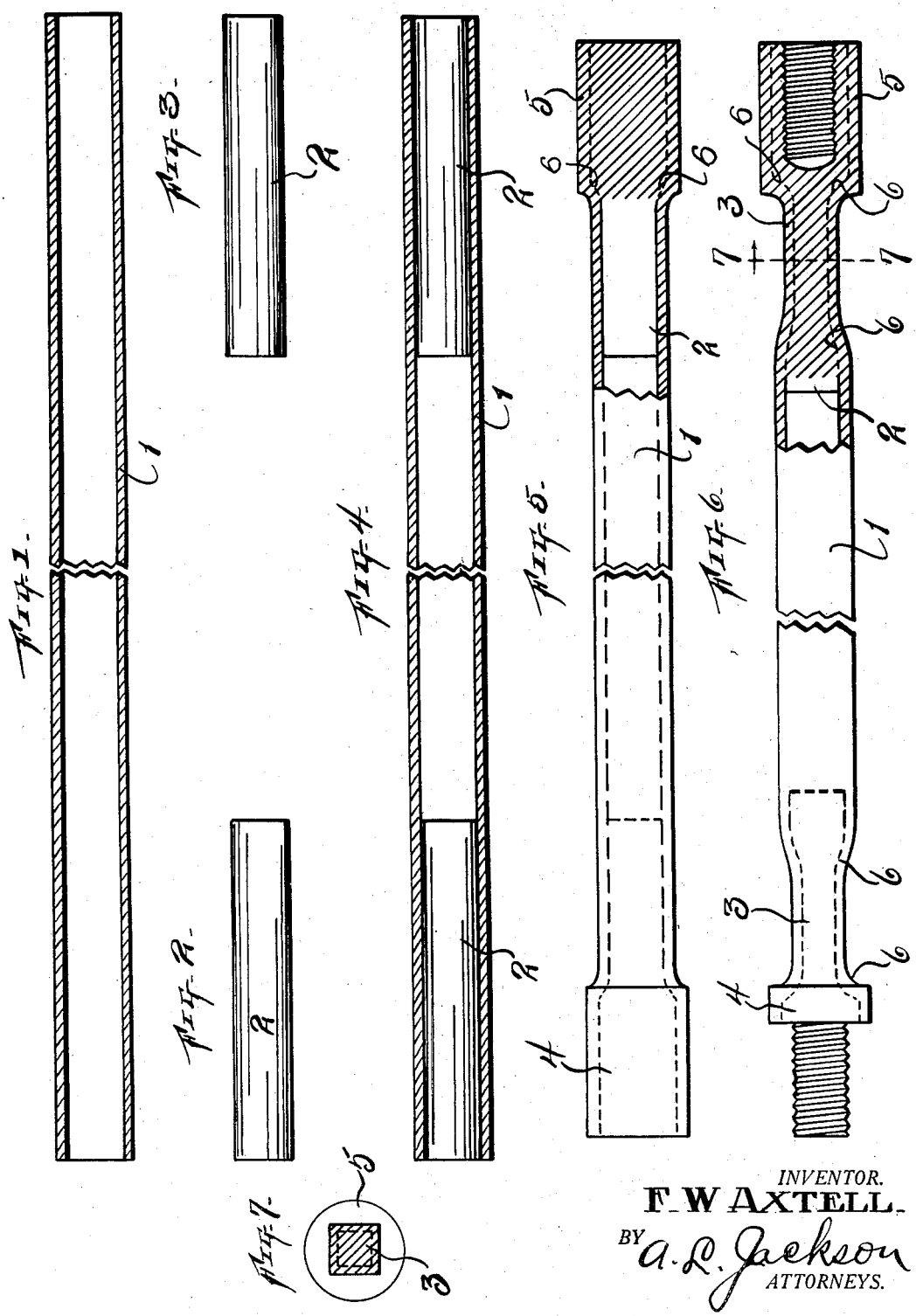
INVENTOR.
F. W. AXTELL.
BY A. L. Jackson
ATTORNEYS.

Patented Apr. 8, 1930

1,753,638

UNITED STATES PATENT OFFICE

FRED W. AXTELL, OF FORT WORTH, TEXAS

PROCESS OF MAKING COUPLINGS FOR SUCKER RODS AND THE LIKE

Application filed September 26, 1927. Serial No. 221,989.

My invention relates to a process of forming couplings for sucker rods and the like; and the object is to make sucker rods in a more economical way and to make better sucker rods which will not be pulled apart in operation and to provide a new process for making sucker rod couplings. Other objects and advantages will be fully explained in the following description and the invention will be more particularly pointed out in the claims.

Reference is had to the accompanying drawings which form a part of this application.

Fig. 1 shows a longitudinal section of a piece of pipe which is to be formed with the coupling members at its ends.

Figs. 2 and 3 show two pieces of rod which are to be inserted in the ends of the pipe.

Fig. 4 shows the rods and pipe assembled to be formed with coupling members at the ends.

Fig. 5 illustrates the same parts after the rods and pipe have been welded together and up-set preparatory to being cored and threaded to make the finished product.

Fig. 6 shows the complete product, partly in section.

Fig. 7 is a cross-section, taken on the line 7—7 of Fig. 6.

Similar characters of reference are used to indicate the same parts throughout the several views.

This invention relates to a product which is made of a pipe and smaller rods which are inserted in the pipe at the ends thereof to form coupling portions on the ends of the pipe which are integral with the pipe. A pipe 1 of the required length is selected. Pieces of rod 2 are driven in the ends of the pipe 1. The pipe and the rod sections are then heated and welded together. While in malleable or workable condition, the ends of the rod sections and the pipe which have become integral by welding are up-set by hammering on the ends of the welded portions until they are approximately of the length and size shown in Figs. 5 and 6. The welded portions are further formed into portions 3 which are square in cross-section for the purposes of making the sucker rods easily engaged by a wrench of ordinary type when the rods are to be coupled and uncoupled. The enlarged members 4 and 5 have become solid metal by the process of heating and upsetting or hammering, and are ready to be completed. The end portion 5 is bored out at the end and threaded to form the female end portion of the rod. The member 4 is reduced to the form shown in Fig. 6 and threaded exteriorly to form the male end of the sucker rod. In reducing the portions 3 to the form, square in cross-section, the rods 2 are more securely retained in the ends of the pipe 1 because there are shoulders 6 formed at each end of the end portions 3. There are exterior shoulders 6 on the rods 2 and interior shoulders 6 in the pipe 1. Each pipe or section of a sucker rod thus has coupling members on the ends thereof which cannot be removed. The sucker rods are thus reduced in the number of parts to be handled and this makes the improved sucker rods of practical commercial value.

It is apparent that various changes in sizes, lengths, and proportions may be made without departing from my invention.

Another advantage of this invention is that the hollow sucker rods are made air and water tight. The displacement of the water by the hollow pipe is of commercial value because the sucker rods are made lighter by the buoyant effect of the vacuum in the pipe.

What I claim is:—

1. A process of making air and water tight pipe couplings for sucker rods which consists in selecting a pipe of required length, driving rods in the ends of the pipe, heating the pipe ends with the rods therein to welding point, upsetting the ends of the combined pipe and rods to enlarge the same, reducing a portion of one of the enlarged members and threading to form the male coupling, and boring out the other enlarged member and threading it interiorly to form the female end of the coupling.

2. A process of making air and water tight pipe couplings for sucker rods which consists in selecting a pipe of required length, driving rods in the ends of the pipe, heating the pipe ends with the rods therein to welding point, upsetting the ends of the combined pipe and rods endwise to enlarge the same radially, reducing a portion of one of the enlarged members and threading the reduced portion to form the male coupling, boring out the other enlarged member and threading it interiorly to form the female end of the coupling.

3. A process of making air and water tight pipe couplings for sucker rods which consists in selecting a pipe of required length, driving rods in the ends of the pipe, heating the ends of the pipe with the rods therein to welding point, upsetting the ends of the combined pipe and rods endwise to enlarge the same radially, threading a portion of one enlarged member to form the male coupling, boring out the other enlarged member and threading it interiorly to form the female coupling, and reducing portions of the rods and pipe to members square in cross-section to form engaging members and to form shoulders to prevent separation of the rods and pipe.

4. A process of making air and water tight pipe couplings for sucker rods which consists in selecting a pipe of required length, driving rods in the ends of the pipe, heating the ends of the pipes and the rods therein to welding point, welding the rods and pipe to an integral mass and upsetting the same to form enlarged end members, and reducing portions of the combined rods and pipe adjacent to said enlarged members to form engaging members and to form shoulders on the respective rods and in the pipes to prevent removal.

In testimony whereof, I set my hand, this 20th day of September, 1927.

FRED W. AXTELL.